E. M. SMITH.
Corset-Steel.
No. 212,520.  Patented Feb. 18, 1879.
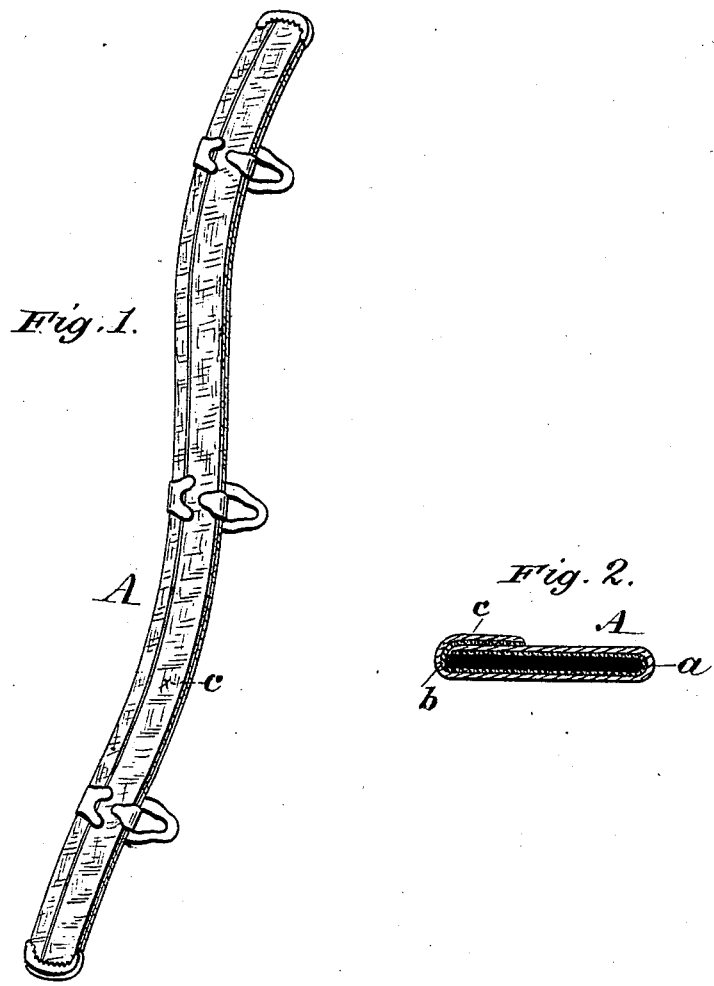
Witnesses:
E. A. Dick
E. E. Masson
Inventor:
Elsie M. Smith
by A. Pollok
atty.

UNITED STATES PATENT OFFICE.

ELSIE M. SMITH, OF FISHKILL LANDING, NEW YORK.

IMPROVEMENT IN CORSET-STEELS.

Specification forming part of Letters Patent No. 212,520, dated February 18, 1879; application filed November 19, 1878.

*To all whom it may concern:*

Be it known that I, ELSIE M. SMITH, of Fishkill Landing, in the county of Dutchess and State of New York, have invented a new and useful Improvement in the Manufacture of Corset Stays or Steels, which improvement is fully set forth in the following specification.

This invention relates to the manufacture of corset-steels or metallic stays which shall be proof against perspiration, and not liable to become rusty to discolor the garments of the wearer, or to break by reason of the rust.

It consists in a corset-stay, made of steel or equivalent metal, covered with an impervious flexible coating of rubber, vulcanized after application, or of rubber or similar water-proof gum and cloth, the rubber being vulcanized or in an unvulcanized condition.

The following description will enable those skilled in the art to which it appertains to make and use my said invention.

In the drawings, Figure 1 represents a cloth-covered corset-steel made in accordance with my invention, and Fig. 2 a cross-section on an enlarged scale.

A is the stay; *a*, the interior steel portion; *b*, the rubber coating between the steel and the outer cloth covering, *c*.

The steel is made in the usual way. Various methods may be employed to apply the rubber or rubber and cloth coating, and one or the other will probably prove the most advantageous, according to circumstances.

Rubber prepared for vulcanization may be rolled into a sheet, and a strip of it wrapped about the steel, or the steel may be otherwise covered therewith. The rubber is to be then vulcanized on the steel. If the stay is to be covered with cloth, this may be applied to the rubber-coated steel before vulcanization, the outer edge being secured by vulcanizable cement; but I prefer, when cloth is used, the method described below.

Care should be taken to have the ends, as well as the rest of the steel, covered with the impervious envelope.

The rubber need not be submitted to the vulcanizing process when cloth is used. The rubber or rubber cement is, preferably, in the event of using an outer cloth covering, applied to the surface of the cloth, which is then wrapped about the steel stay, with the rubber in contact with the surface, and may or may not be vulcanized in place.

The steel should be perfectly dry before the coating is applied. After the coating or envelope has been applied the ends may be protected by caps, as shown in the drawings. The fastening devices shown may also be then applied.

The principal feature of my improvement is that the coating is impervious and permanently flexible, and does not become hard or rigid.

Instead of rubber, other impervious cement which remains permanently flexible after application may be used.

Protective coatings have heretofore been used, which, being hard, rigid, or not permanently flexible, are liable to break or snap by the bending of the corset-stay, and which partially destroy the flexibility and elasticity of the steel—such, for example, as celluloid or vulcanite. In speaking of rubber, therefore, I desire it to be understood that I do not include hard rubber or vulcanite, which, when applied as a coating to corset-steels, is liable to the objections as above stated.

By the application of the impervious elastic coating, as aforesaid, formed of rubber or rubber cloth, or equivalent material, the original cost, as compared with that of the cloth, paper, and lacquer covered articles ordinarily used, is not much increased, while the time during which the stay can be used is very much prolonged, and the injury to the garments of the wearer from the rusting of the steel by the action of perspiration is prevented.

Having thus described my invention, what I claim, and desire to secure by Letters Patent, is—

1. A corset-steel or metallic stay covered with cloth rendered water-proof by a flexible impervious cement, substantially as described.

2. A corset-steel covered with a flexible impervious envelope of cloth and rubber, vulcanized or unvulcanized, or rubber cloth, substantially as set forth.

3. A metallic corset stay or steel covered with a flexible impervious envelope of cloth and vulcanized rubber, substantially as set forth.

4. A corset-steel covered with a flexible impervious envelope of soft rubber or rubber cloth, applied directly to the surface of the steel and vulcanized in contact therewith, substantially as set forth.

In testimony whereof I have signed this specification in the presence of two subscribing witnesses.

ELSIE M. SMITH.

Witnesses:
   JOHN F. SCHLOSSER,
   HENRY SCHLOSSER.